United States Patent [19]

Suzuki

[11] Patent Number: 5,440,551
[45] Date of Patent: Aug. 8, 1995

[54] MULTIMEDIA PACKET COMMUNICATION SYSTEM
[75] Inventor: Hiroshi Suzuki, Tokyo, Japan
[73] Assignee: NEC Corporation, Tokyo, Japan
[21] Appl. No.: 177,755
[22] Filed: Jan. 4, 1994
[30] Foreign Application Priority Data
 Jan. 5, 1993 [JP] Japan ................................. 5-000141
[51] Int. Cl.⁶ ........................................... H04Q 11/04
[52] U.S. Cl. ..................... 370/60; 370/68.1; 370/94.1
[58] Field of Search ........................ 370/60, 94.1, 60.1, 370/94.2, 68.1, 108, 79, 13.1, 85.13
[56] References Cited
 U.S. PATENT DOCUMENTS
 4,899,333 2/1990 Roediger ............................. 370/94.1
 4,922,486 5/1990 Lidinsky et al. ................... 370/94.1
 4,977,582 12/1990 Nichols et al. ...................... 370/108

*Primary Examiner*—Douglas W. Olms
*Assistant Examiner*—Shick Hom
*Attorney, Agent, or Firm*—Sughrue, Mion, Zinn, Macpeak & Seas

[57] ABSTRACT

A multimedia packet communication system wherein connections can be selectively used automatically and dynamically in accordance with qualities required by an application, in which a plurality of communications of different required qualities are involved, to set quality classes. The multimedia packet communication system comprises a network layer which can map a plurality of different required qualities from a layer protocol which is higher than the network layer into corresponding connection types. The network layer includes a driver for setting the thus mapped connections to individual packets.

3 Claims, 4 Drawing Sheets

| | UDP | TCP Short burst | TCP Long burst(FTP) | Stream type Realtime Video |
|---|---|---|---|---|
| 300 | | | | |
| 301 | No set up delay | Short setup delay | Low loss High-throughput Long setup delay | Low loss & delay High-throughput Long setup delay |
| 302 | CONNECTIONLESS MODE | CONNECTION MODE | | |
| 303 | FIXED/DEFAULT RATE BAND ALLOCATION | | DYNAMIC/ADAPTIVE RATE BAND ALLOCATION | |
| 304 | DATA TYPE AAL | | | STREAM TYPE AAL |

FIG.2

| | UDP | TCP<br>Short burst | TCP<br>Long burst(FTP) | Stream type<br>Realtime Video |
|---|---|---|---|---|
| 301 | No set up delay | Short setup delay | Low loss<br>High-throughput<br>Long setup delay | Low loss & delay<br>High-throughput<br>Long setup delay |
| 302 | CONNECTIONLESS MODE | | CONNECTION MODE | |
| 303 | FIXED/DEFAULT RATE BAND ALLOCATION | | DYNAMIC/ADAPTIVE RATE BAND ALLOCATION | |
| 304 | DATA TYPE AAL | | | STREAM TYPE AAL |

(300)

MULTIMEDIA PACKET COMMUNICATION SYSTEM

BACKGROUND OF THE INVENTION

1. Field of the Invention

This invention relates to a multimedia packet communication system wherein, in multimedia packet communication of a plurality of qualities which is performed by way of a packet network, connections can be used automatically and dynamically to set quality classes individually in accordance with qualities required by applications while connection control is not performed directly by an application protocol.

2. Description of the Related Art

Attention is paid to an ATM (Asynchronous Transfer Mode) as a multimedia packet communication system which has a plurality of qualities. Conventionally, when it is tried to support a packet communication terminal in an ATM network, a connection oriented mode wherein a virtual circuit (VC) is set between calling and receiving terminals and a connectionless mode wherein such setting is not performed are available, and those modes are statically used separately for different applications. For example, in order to support short packet communication, file transfer communication and moving picture communication simultaneously, it is required for the individual application to first perform virtual circuit connection control directly and then perform packet transfer under a separate protocol. This is because a network protocol such as an IP (Internet Protocol) which makes an upper layer of an ATM network does not have a function of performing either of such connection and resource management.

A conventional protocol will be described in detail with reference to FIG. 4. In a data communication system based on a protocol such as a TCP (Transmission Control Protocol)/UDP (User Datagram Protocol)/IP (Internet Protocol), in order to support communication for a moving picture or an audio signal, an application 100 to be used with an ATM network 106 must be a stream type application wherein a packet is directly converted into cells without using the TCP/IP. Therefore, a protocol 104 for exclusive use for a moving picture and an audio signal must be prepared. Description will be given below how a connection is set in this instance.

Data of the TCP 102, a UDP 101 or the like use an ATM connection by way of the IP 103 which is a network layer. In one of connection setting methods, a connection is established by a signalling section 105 in accordance with a destination IP address of a packet to perform packet transfer. In this instance, however, a requirement for a quality from an upper layer is not discriminated by the IP 103 which is a network layer, and connection setting control is performed decisively by the signalling section 105. Since the IP 103 does not establish a connection and cannot distinguish a packet of the UDP 101 type and another packet of the TCP 102 of the connection type desired to be communicated from each other, it cannot selectively determine whether a packet should be sent in a connectionless mode or a connection should be established, and effective communication cannot be realized. Further, also in data transfer by the same TCP 102, since distinction between different quality packets cannot be performed by the IP 103 as in an FTP (File Transfer Protocol) or a remote terminal protocol called TELNET, if the address is the same, then a same connection may possibly be set, and consequently, quality control cannot be performed. Accordingly, when a file transfer application of an FTP or the like is desired to have an ATM connection having a special band, the application must necessarily start the signalling section 105 directly.

Meanwhile, in the case of the protocol 104 for exclusive use for a moving picture and an audio signal, the application must necessarily control the signalling section 105 directly without using an IP protocol to set a connection of a constant bit rate to effect communication.

As described above, in the conventional protocols, even when it is desired to switchably use connections of different qualities simultaneously and dynamically as In multimedia communication, connections must be started for each application, and the protocols are complicated with an application having a plurality of qualities. Consequently, there is a problem in that only static connection setting can be performed and effective packet communication cannot be performed.

SUMMARY OF THE INVENTION

It is an object of the present invention to provide a packet communication system for use with an ATM network wherein connections can be selectively used automatically and dynamically in accordance with qualities required by an application, in which a plurality of communications of different required qualities are involved, to set quality classes.

In order to attain the object described above, according to the present invention, there is provided a multimedia packet communication system, which comprises a network layer including mapping means for mapping a plurality of different required qualities from a layer protocol of a higher than the network layer into corresponding connection types, and a driver for setting the thus mapped connections to individual packets.

Preferably, an application layer of a higher than the network layer delivers quality parameters such as an identifier between a stream type and a burst type, a degree of a delay of packet transfer and a degree of a throughput together with an address of the other party to the network layer, and the mapping means performs, for each packet, setting of a mode to a connectionless mode or a connection mode and setting of whether or not reservation of a band should be performed in accordance with the quality parameters delivered thereto from the application layer. Preferably, the driver transfers a packet in a permanent connection for exclusive use when a result of mapping of the mapping means indicates a connectionless mode. Preferably, the driver first sets a connection by means of signalling means and then transfers the packet when the result of mapping of the mapping means indicates a connection mode and the setting that reservation of a band should be performed.

With the multimedia packet communication system, since the network layer includes the mapping means for mapping a plurality of different required qualities from the application protocol of a higher than the network layer into corresponding connection types and the driver for setting the thus mapped connections to individual packets, the application protocol can use connections automatically and dynamically to set quality classes individually in accordance with required qualities without directly performing connection control. Consequently, connections can be used to set quality classes individually in accordance with a quality required by the application in which a plurality of communications having different required qualities are involved.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagrammatic view illustrating an example of a format in mapping of a required quality and a connection type In the hierarchy of FIG. 1;

DETAILED DESCRIPTION OF THE PREFERRED EMBODIMENT

Figure 1:
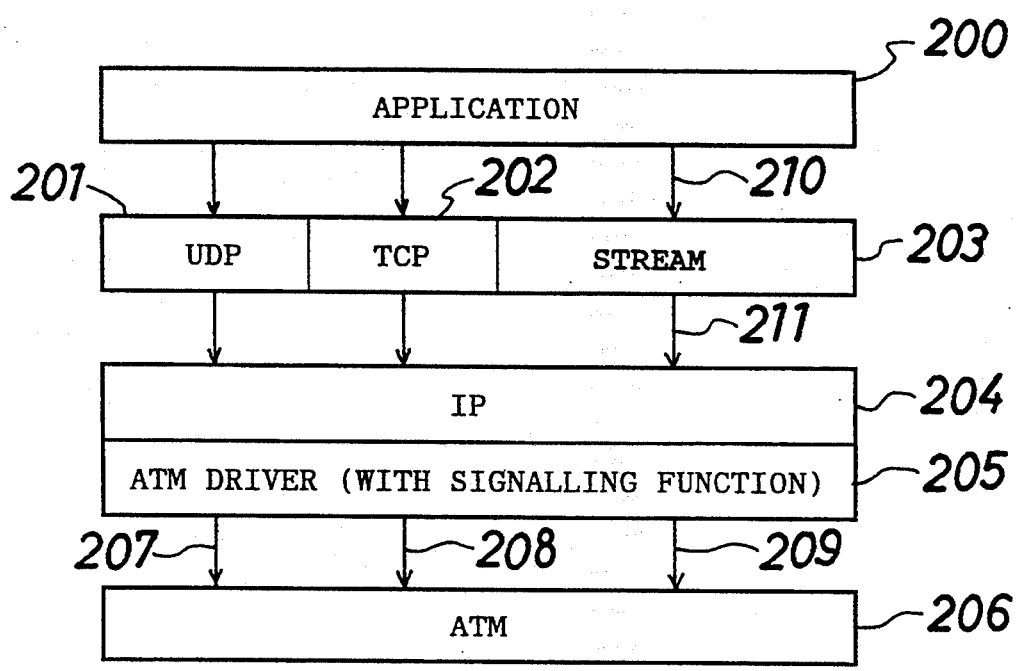
FIG. 1 is a diagrammatic view of the hierarchy of a multimedia protocol structure of a multimedia packet communication system showing a preferred embodiment of the present invention.

Referring first to FIG. 1, there is shown a multimedia protocol structure of a multimedia packet communication system to which the present invention is applied. An application layer 200 provides quality parameters 210 such as a data size, a delay/throughput and a reliability against an error to a UDP 201, which is a transport layer of a lower order, a TCP 202, and a stream type transport protocol 203 for a moving picture together with an address of the other party. In response to the parameter against an error, the UDP 201 performs transfer of data without error/flow control while the TCP 202 performs transfer of data involving error/flow control. For transfer of a moving picture and so forth, the stream type transport protocol 203 by which conversion between a stream and a packet and absorption of a variation of a delay of a packet are performed is used.

The transport protocol 203 relays the quality parameters 210 from the application 200 and delivers a packet to an IP 204 which is a network player. The IP 204 performs mapping of mode selection in response to requiring parameters 211 for a delay, a throughput and so forth.

FIG. 2 illustrates an example of a format of such mapping. Transport protocols are set in a first rank 300; quality requirements in the transport protocols are set in a second rank 301; connection types are set in a third rank 302; band allocation types are set in a fourth rank 303; and types of an ATM adaptation layer (AAL) are set in a fifth rank 304.

the example illustrated in FIG. 2, a UDP, a TCP of the short burst, another TCP of the long burst and a stream type protocol are set as the transport protocols of the first rank 300. As the quality requirements of the second rank 301, a no setup delay to the UDP, a short setup delay to the TCP of the short burst, a low loss, a high throughput and a high setup delay to the TCP of the long burst, and a low loss and delay, a high throughput and a high setup delay to the stream type delay are set. As the connection types of the third rank 302, a connectionless mode to the UDP and a connection mode to the TCP of the short burst, the TCP of the long burst and the stream type protocol are set. As the band allocation types of the fourth rank 303, a fixed/default rate band allocation to the UDP and the TCP of the short burst and a dynamic/adaptive rate band allocation to the TCP of the long burst and the stream type protocol are set. As the AAL types of the fifth rank 304, a data type AAL to the UDP, the TCP of the short burst and the TCP of the long burst and a stream type AAL to the stream type protocol are set.

Since a packet to be sent by a UDP must necessarily be sent with a low delay, if setting of a connection is performed, then the delay requirement cannot be satisfied. Therefore, a packet is sent in the connectionless mode (CL). In particular, a permanent connection (PVC) to a connectionless server (router) is set and a static band is allocated to the permanent connection, and a packet is sent fixedly by way of the PVC. Since the UDP does not involve error/flow control originally, a band for exclusive use for the packet is not allocated to the PVC. Further, since the UDP does not require the correctness in order of arrival of packets, any replacement of packets in order caused by a variation of the route upon transmission using a connectionless server is permitted.

While a packet of the TCP must be sent with a high degree of reliability, since an initial delay is generally permitted by an amount of a delay in which a TCP connection is established, the packet can be transmitted after setting of a connection is performed within the range of the permitted delay. In the band allocation, in the case of a short packet, a lowest band per VC is allocated by default. Once a connection is established, unless network congestion occurs, a packet can be transferred with a high degree of accuracy.

Meanwhile, when high speed transfer of a large file such as an FTP among various services supported by the TCP is to be performed, allocation not of a default lowest band but of a band corresponding to a required burst size and a delay requirement is required. However, when the network is crowded, such adaptive band allocation as to reduce a required band to effect transmission to increase a delay is possible.

For a packet of the stream type such as a moving picture, a connection is established after a required band is reserved. If the required band is fixed irrespective of the situation of the network and the network is crowded, setting of a connection is rejected. Once a connection is set, transfer of a stream of a high throughput and a low delay is allowed. Only for services of the moving picture type, different from services of data, ATM adaptation for exclusive use for a stream wherein ATM cells are not assembled into a packet (or a packet is not disassembled into packets) is used.

A result of the mapping of the quality requirements in the network layer into such connection types as illustrated in FIG. 2 described above is transferred to an ATM driver 205 of FIG. 1. The ATM driver 205 sets a connection to the destination address in response to the requirements by means of a signalling handler. Thus, such control that either a band is allocated to the connections or the connection is established in a lowest band in response to the required band and then the band is varied dynamically in accordance with the necessity is performed. In the connectionless mode, a packet is transferred to the connectionless server using a fixedly established PVC for exclusive use.

Figure 3:
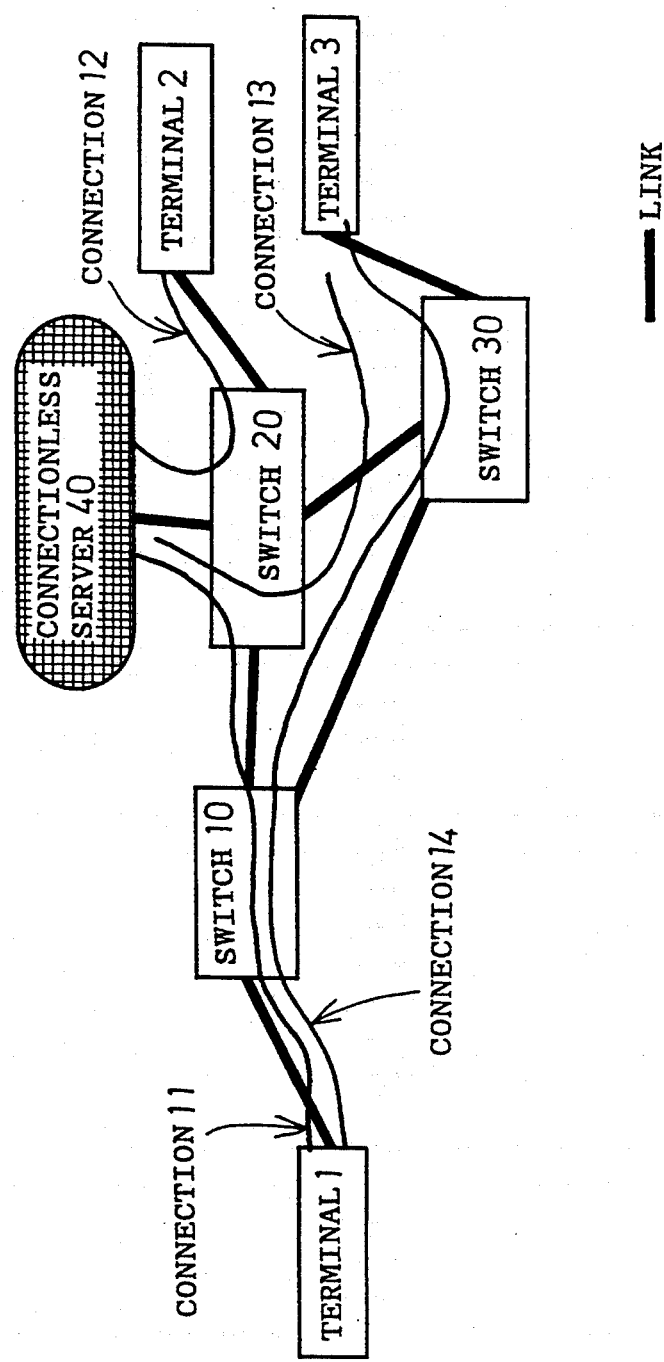
FIG. 3 is a diagrammatic view of a route illustrating an example of a connection in the hierarchy of FIG. 1.
Figure 4:
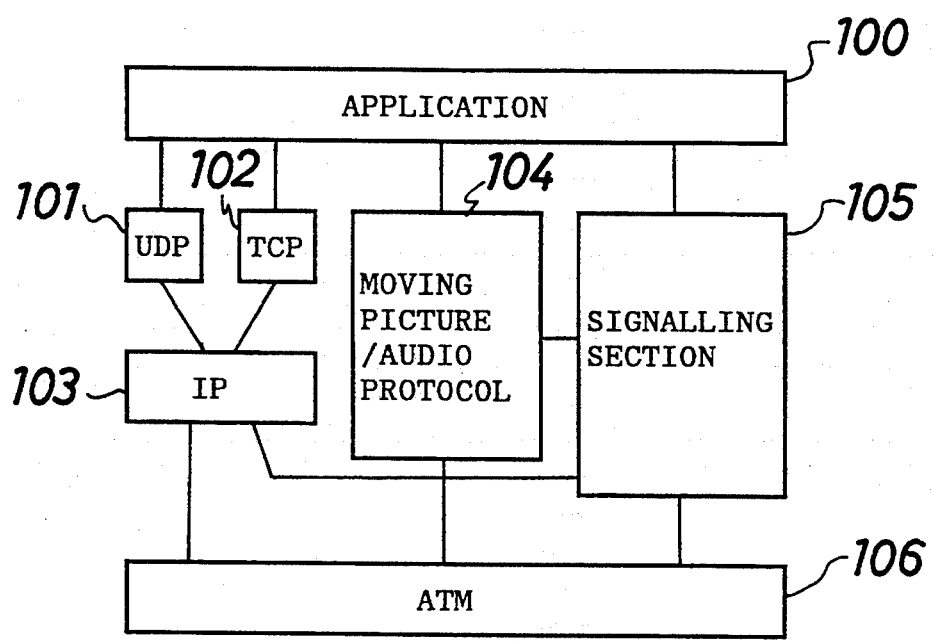
FIG. 4 is a diagrammatic view of the hierarchy of a conventional multimedia protocol structure.

A case wherein a PVC is used and another case wherein a connection is established to a destination terminal will be described with reference to FIG. 3. The case wherein a terminal 1 is to be communicated with another terminal 2 or a further terminal 3 by way of a switch 10 and another switch 20 or 30 is examined. A connectionless server 40 is prepared for the network, and the terminals 1, 2 and 3 are connected fixedly to the connectionless server 40 by way of the connections 11, 12 and 13 in the form of PVCs. When communication is to be performed in the connectionless mode, a packet is transferred once to the connectionless server 40, in which it is returned to the IP layer, and then it is transferred in accordance with its destination address. The PVCs are connected fixedly upon initialization.

On the other hand, a connection is set between the terminals 1 and 3 on the signalling requirement base by way of the switches 10 and 30. In this instance, since an ATM connection is established directly between the terminals 1 and 3, a packet is transferred at a high speed without intermediately undergoing processing of the IP layer.

The ATM preferentially transfers a packet of a moving picture or a file for which a band has been reserved. Another packet for which a band has been allocated by default in the connectionless mode is transferred less preferentially since the requirement for quality is not severe.

Having now fully described the invention, it will be apparent to one of ordinary skill in the art that many changes and modifications can be made thereto without departing from the spirit and scope of the invention as set forth herein.

What is claimed is:

1. A multimedia packet communication system, comprising:
    a network layer; and
    an application layer of a higher order than said network layer;
    said application layer delivering a plurality of different quality parameters including an identifier between a stream type and a burst type, a degree of a delay of packet transfer and a degree of a throughput together with an address of the other party to said network layer;
    said network layer including mapping means for mapping, for each packet, setting of a mode to a connectionless mode or a connection mode and setting of whether or not reservation of a band should be performed in accordance with the quality parameters delivered thereto from said application layer, and an ATM driver for establishing a connection to the address of the other party in accordance with a result of the mapping and executing band control to effect a transfer of packets in an asynchronous transfer mode.

2. A multimedia packet communication system as claimed in claim 1, wherein said ATM driver transfers a packet in a permanent connection for exclusive use when a result of mapping of said mapping means indicates a connectionless mode.

3. A multimedia packet communication system as claimed in claim 2, wherein said driver first sets a connection by means of signalling means and then transfers the packet when the result of mapping of said mapping means indicates a connection mode and the setting that reservation of a band should be performed.

* * * * *

UNITED STATES PATENT AND TRADEMARK OFFICE
CERTIFICATE OF CORRECTION

PATENT NO. : 5,440,551
DATED : Aug. 8, 1995
INVENTOR(S) : Hiroshi Suzuki

It is certified that error appears in the above-indentified patent and that said Letters Patent is hereby corrected as shown below:

Col. 3, Line 58 before "the" insert --In--

Col. 6, Line 29 after "said" insert --ATM--

Signed and Sealed this

Seventh Day of November, 1995

Attest:

BRUCE LEHMAN

*Attesting Officer*    *Commissioner of Patents and Trademarks*